March 7, 1967 L. BERTHOD 3,308,032
SWIMMING POOL TYPE REACTORS
Filed April 1, 1964 5 Sheets-Sheet 1

INVENTOR.
LOUIS BERTHOD
BY Corey, Harr & Stemple
ATTORNEYS

March 7, 1967 L. BERTHOD 3,308,032
SWIMMING POOL TYPE REACTORS
Filed April 1, 1964 5 Sheets-Sheet 3

INVENTOR.
LOUIS BERTHOD
BY
ATTORNEYS

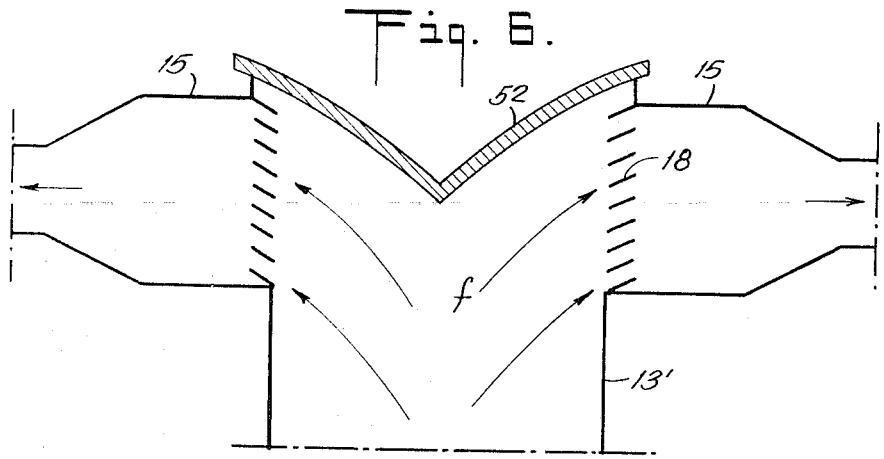
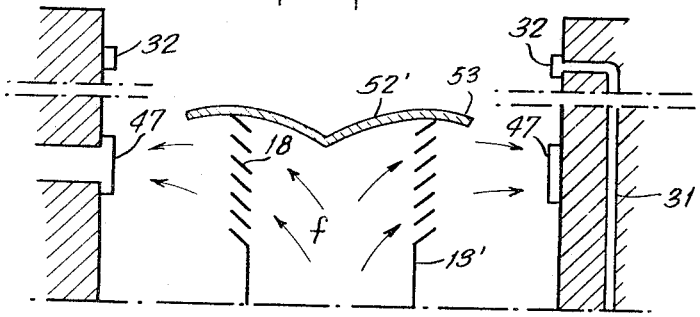
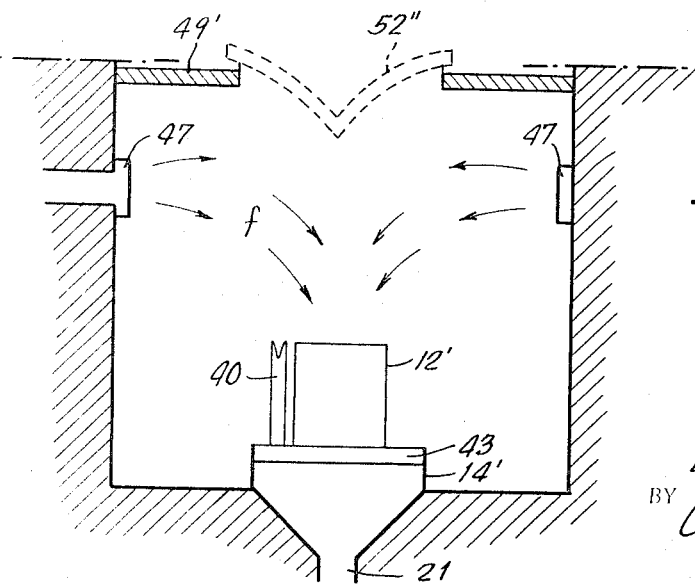

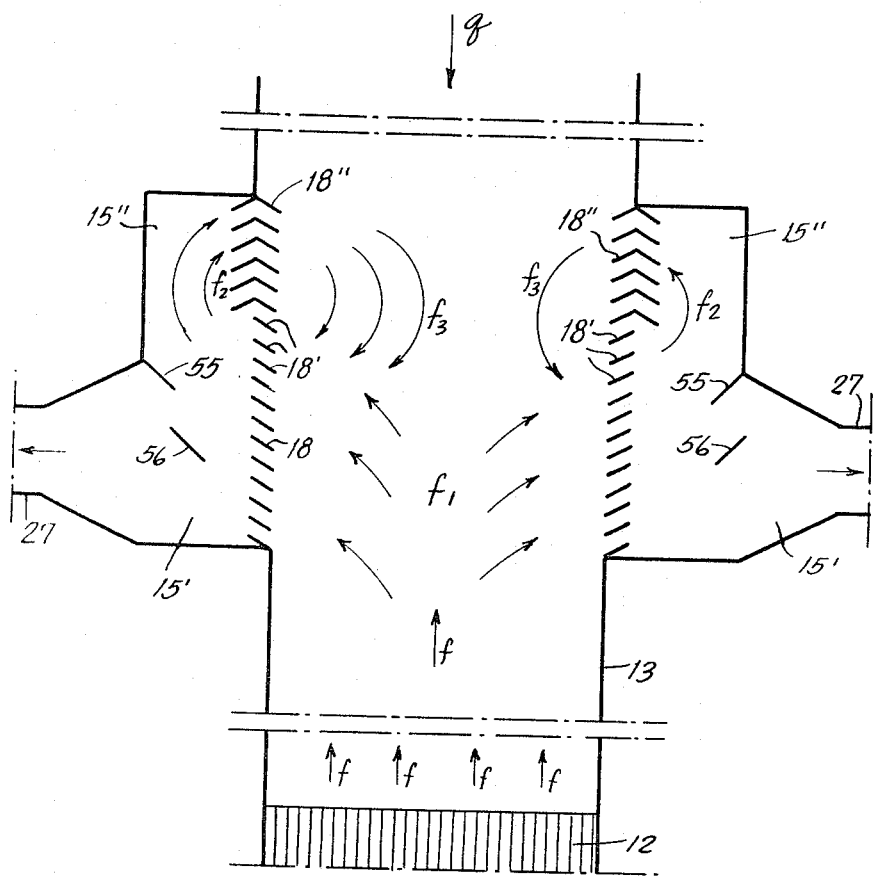

United States Patent Office 3,308,032
Patented Mar. 7, 1967

3,308,032
SWIMMING POOL TYPE REACTORS
Louis Berthod, Grenoble, France, assignor to Societe Grenobloise d'Etudes et d'Applications Hydrauliques, Grenoble, France, a corporation of France
Filed Apr. 1, 1964, Ser. No. 356,444
Claims priority, application France, Apr. 5, 1963, 4,555; May 21, 1963, 4,579; May 22, 1963, 4,580; Mar. 13, 1964, 4,659
15 Claims. (Cl. 176—62)

This invention relates to conventional swimming pool reactors in which the fuel elements are immersed in water which also serves as a cooling and moderating medium. This type of reactor has the advantage that the fuel elements are readily accessible at their cores and all necessary fuel rod inspections and replacements, and other necessary operations may be carried out under excellent conditions from above.

The aforesaid type of reactor has the disadvantage however, that its output falls off fairly rapidly as the activity of the water circulating through the core increases. If this activated water is allowed to rise directly to the surface of the pool it would expose the plant personnel to excessive radiation. Various ways of overcoming this difficulty have been considered. Thus it has been proposed to pump the pool water through the core and then through deactivation means such as an ion exchange bed before returning it to the pool. However, the rate of flow required for reactor outputs in excess of those customary today, would be too high for all of it to be passed across an ion exchange bed. Another method that has been proposed is the installation of a Plexiglas plate at a depth of one or two meters below the surface. While this method has proved effective, it interferes with the accessibleness of the core.

The primary purpose of the present invention is to provide an improved swimming pool type of reactor which is enabled to run at high outputs without sacrificing any of its present accessibility of permitting the activated water to rise to the free surface of the pool.

In accordance with the invention an independent cooling water circulation system is set up within the body of the swimming pool water and is provided with such flow conditions that although the activated water in such independent system is not separate from the body of the water in the pool, none of such activated water is able to flow to the free surface of the swimming pool. This result is accomplished in accordance with the invention, by providing in the pool suitable guides and/or pressure distribution arrangements such as will ensure that the cooling water will flow according to a definite pattern in one direction or the other through the core and the body of the pool water.

A better understanding of the invention will be obtained from the following description when considered in connection with the accompanying drawings which illustrate various forms in which the invention may be practiced and in which FIG. 1 is a diagrammatic illustration of a swimming pool reactor equipped in accordance with one form of the invention;

FIG. 6 is a diagrammatic view of the upper part of a reactor core showing another embodiment of the invention;

FIG. 7 is a view similar to FIG. 5 showing a different arrangement of the screen and ring guiding device;

FIG. 8 is a view substantially similar to FIG. 3 illustrating how the guiding means may be modified to guide a reversal flow of cooling water; and FIG. 9 is a view showing how the screens per se can be utilized to control the water in one direction or the other.

Figure 1:
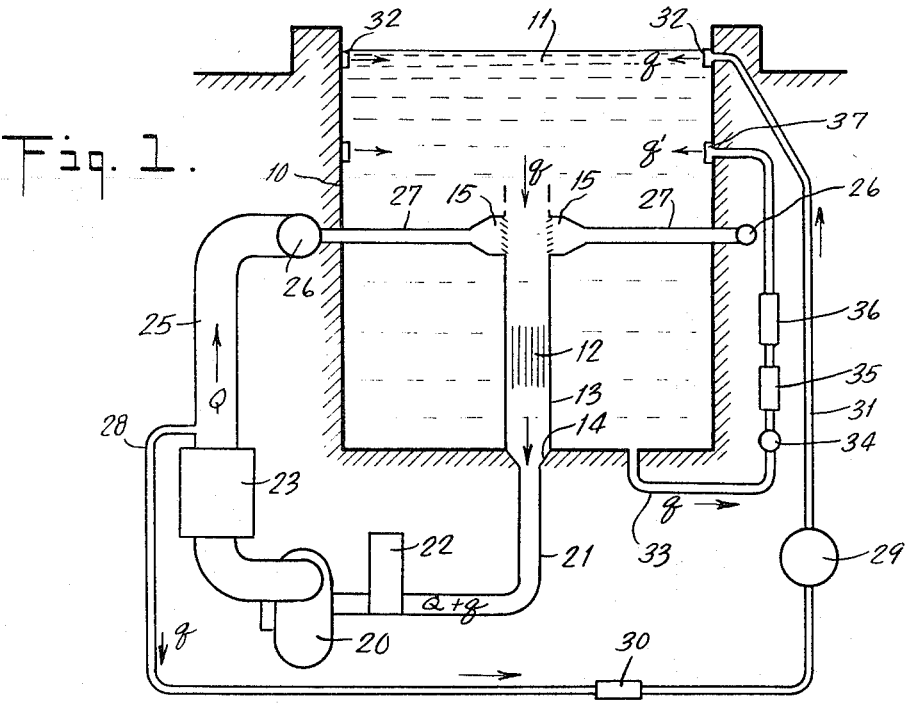
Figure 2:
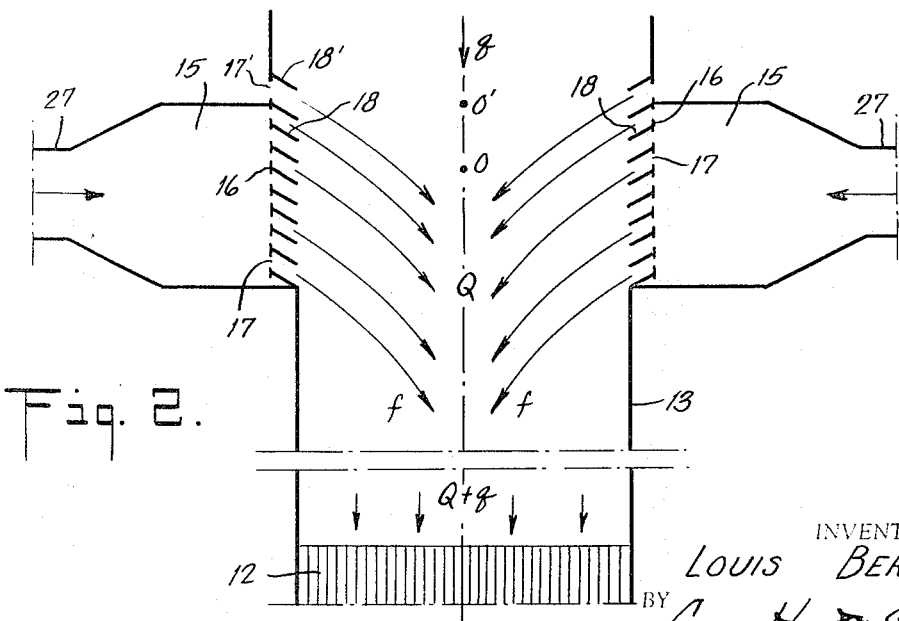
FIG. 2 is an enlarged detailed view of the upper part of the reactor core shown in FIG. 1.

In the following description of the drawings, the same references will be utilized to designate similar parts in all of the figures thereof. Referring now more particularly to FIGS. 1 and 2 of the drawings, which show a swimming pool reactor composed of a conventional swimming pool 10 full of water 11 and having immersed therein a reactor core 12. In accordance with the invention, the reactor core is enclosed in a tank 13 which is open at its top and which is provided at its bottom with an outlet orifice 14, the core 12 being suitably supported in such tank intermediate the upper and lower ends of the latter.

The cooling water enters into the upper part of the tank 13 at a given rate of flow under low pressure mainly by way of a plurality of distributors 15, the number of which depend on the required flow conditions. Each distributor 15 discharges through a screen 16 having holes 17 which increase in size from the top of the screen towards its bottom. Associated with the screen 16 are slats 18 for guiding the distributor discharge in the required direction, namely, down toward the reactor core. The slats 18 may be made adjustable and may be fully closing in certain cases. The core tank 13 extends up above the level of the distributors 15 and is provided adjacently above the latter with openings 17' and associated slats 18'.

It will be noted that in the operation of the above described pressure and flow distribution arrangement, the velocity distribution curve that will be obtained is such that the highest rates of flow of the cooling water will occur at the bottoms of the distributors 15, and that the pressure at the point O in FIG. 2 will be less than that at point O'. With this flow pressure arrangement and the directive influence of the slats 18 there is ensured a flow Q of cooling water from the distributors 15 downwardly in the direction of the arrows $f$ and through the reactor core, and any tendency of this cooling water, which is highly radioactive, coming into contact with the main body of water 11 in the swimming pool is prevented.

The cooling water is drawn by a pump 20 through the reactor core 12, a duct 21 connected to the bottom outlet orifice 14 of the core tank 13, and a gas eliminator 22 for removing any gas bubbles that might have formed in the cooling water as a result of the reactor functioning to produce a high output with its cooling system operating under low pressure. After passing through the pump 20, the cooling water passes through a known type of heat exchanger 23 capable of sufficiently cooling the water to the extent desired. From the heat exchanger 23, the cooled water passes through a duct 25 to an annular manifold 26 which encircles the pool of water 11 and from which the cooled water is conducted to the distributors 15 by the ducts 27.

In order to prevent the possibility of even a temporary flow of the cooling water from the core to the main body of water in the swimming pool, a small flow $q$ of swimming pool water is drawn through the open top of the reactor core tank 13 by tapping a small flow from the cooling water circuit and then returning it to the swimming pool. As is shown in FIG. 1, the small flow $q$ is preferably tapped from the cooling water circuit by a pipe 28 at a point in the duct 25 past the heat exchanger 23 where the water is sufficiently cool for the intended purpose. The small flow 8 is drawn from the duct 25 by a pump 29 through an ion exchange bed 30 where it is deactivated. The deactivated water is then preferably returned to the upper part of the swimming pool and discharged therein so that it forms a protective nappe on the swimming pool surface. This may be accomplished as shown in FIG. 1, by pumping the deactivated water up through a duct 31 to an annular-shaped duct 32 provided at the top of the pool. It has been found this supplementary flow of water $q$, which induces a slight flow from the swimming pool into the reactor core, definitely precludes any possibility of a flow of the cooling water in the reverse direction through the top of the core tank 13, and ensures that at least part of the swimming pool water is efficiently deactivated by water adequately cooled by the cooling system heat exchanger.

An additional deactivation circuit for the swimming pool water may also be provided by drawing an appropriate flow $q'$ from the bottom of the swimming pool via a duct 33 and a pump 34. The flow $q'$ of pool water is deactivated in an ion exchange bed 35 and cooled in a heat exchanger 36 before being discharged back into the swimming pool through an annular discharge duct 37. This deactivation system supplements the previously described supplementary system for assuring that there will be no flow of the cooling water into the swimming pool water, and the two systems will provide an adequate deactivation of the swimming pool water.

It will be understood from the foregoing description of the embodiment depicted in FIGS. 1 and 2 of the drawings, that in accordance with the invention means are provided above the reactor core 12 i.e., the distributors 15, screens 16 and slats 18, to direct the flow of cooling water along a given independent path within the water forming the body of the swimming pool and from which the cooling water has no tendency to depart and move upwardly into the water forming the body of the pool; this confinement of the cooling water being ensured by causing a small flow of the swimming pool wated down with the cooling water toward the reactor core. By thus preventing exchanges between the activated water flowing through the core and the water in the swimming pool, the invention enables the swimming pool water to be maintained at an acceptable activation level, which condition is ensured by deactivating the tapped small flow of water before it is returned to the swimming pool water and by continuously tapping a small flow of water out of a side of the swimming pool and deactivating and cooling it before it is returned to the swimming pool water. Thus the plant personnel are effectively protected by the body of the pool against excessive radiation. Since the top of the tank containing the reactor core is always open, there is provided a ready access to the reactor core. It will be noted that the whole or a part of the cooling flow can be fed into the reactor core tank at a sufficient height above the core elements to ensure a satisfactory velocity distribution of the cooling water at the level of the reactor core.

This satisfactory velocity distribution also provides the advantage that any vibration of the fuel or control rods, or other core components is prevented. Also, as is indicated in FIGS. 1 and 2, the top of the reactor core tank 13 can be extended above the cooling water inlet formed by the distributors 15, and if necessary such extension may be made up to the free surface of the swimming pool. When the reactor core tank extends above the cooling water inlet, the tank extension may be provided with appropriately arranged and sized orifices, such as the orifices 17' in FIG. 2, and if necessary, with fixed or adjustable slats, such as the slats 18' in FIG. 2, as a means of improving the intake conditions for the small inflow $q$ from the swimming pool. In those cases where it is found desirable to extend the reactor core tank up to the free surface of the swimming pool, the small flow of deactivated water $q$ tapped from the cooling circuit and flowing to the top of the pool in the duct 31, may be discharged into the top of the swimming pool so that it is fed directly into the top of the reactor core tank in order to maintain a continuously renewed permanent layer of clean water on the free surface at the open top of such tank.

The aforesaid improvements it has been found result in a much more reliable operation than is possible with the known conventional type of swimming pool reactor. For example, in the event of damage to the reactor, such as a can failure, the overall fission products cannot contaminate the water in the swimming pool, since the core cooling water is confined to an independent controlled stream and does not flow into intermixing relation with the water of the swimming pool. As the cooling circuit pressures are low, the reactor core can be made of comparatively light, easily removable and renewable components. For the same reason, no elaborate sealing arrangements are required on the ducts leading to the core tank; ordinary flanges being quite adequate for the purpose and consequently also make for easy dismantling. The bottom part of the reactor core tank is provided with conventional convection valves capable of being readily opened if the cooling system pump stops.

Figure 3:
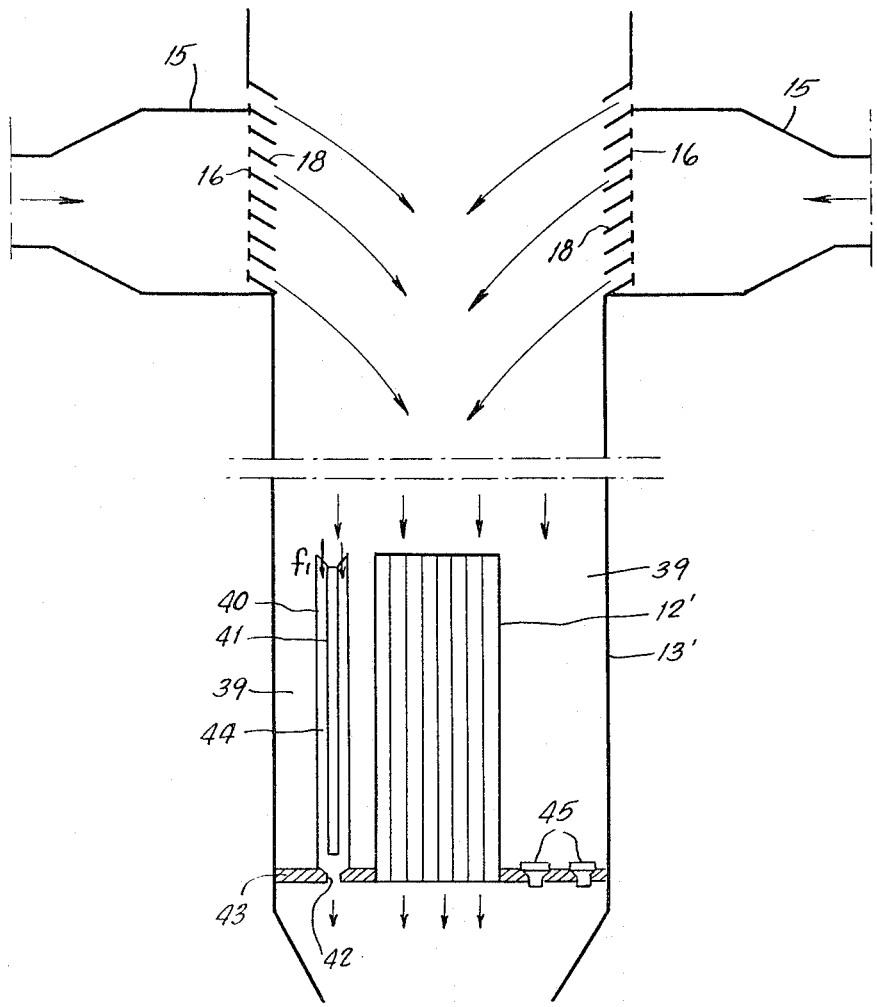
FIG. 3 is a diagrammatic view on an enlarged scale of a modified form of layout in which the reactor core tank has a larger cross-sectional area than that of the reactor core.

The reactor core tank 13' shown in the embodiment of FIG. 3 is substantially similar to tank 13, except that its cross-section is considerably in excess of that of the core so that there is provided a convenient annular area 39 of highly radioactive water between the core 12' and the core tank wall and into which elements can be placed for treatment. Thus, cans 40 containing fuel elements or samples 41 to be treated can conveniently be lowered into the annular area or space 39 through the open top of the reactor core tank 13' and inserted at their bottom ends into holes 42 provided in a supporting screen or partition 43. The upper and lower ends of the cans 40 are constructed to permit the entry into the upper end thereof of a flow of cooling water, which passes downwardly therein in the direction of the arrow $f_1$ through the space 44 therein between the wall of such can and the fuel element or sample 41, and discharges through the lower end thereof within the screen opening 42. The cans 40 may be independent, or may be connected to the swimming pool surface by pipes, instrumentation circuits, etc. Those holes in the support 43 which are not in use may be sealed by suitable plugs 45.

I have found that the flow guiding and pressure distributing devices may also be utilized to set up a circulation inside the swimming pool such that the cooling system discharge re-entering the swimming pool may be discharged at the periphery of the latter and caused to flow toward the reactor core, into it through the top of the reactor core tank, and through the core without the use of distributors 15 as in FIG. 1 and without any of the cooling flow being carried up to the free surface of the swimming pool. As will become apparent from the hereinafter described embodiments of my invention, the flow guiding devices may take the form of fixed or removable guide walls, or of guide vanes adjustable for direction, or a combination of both.

Figure 4:
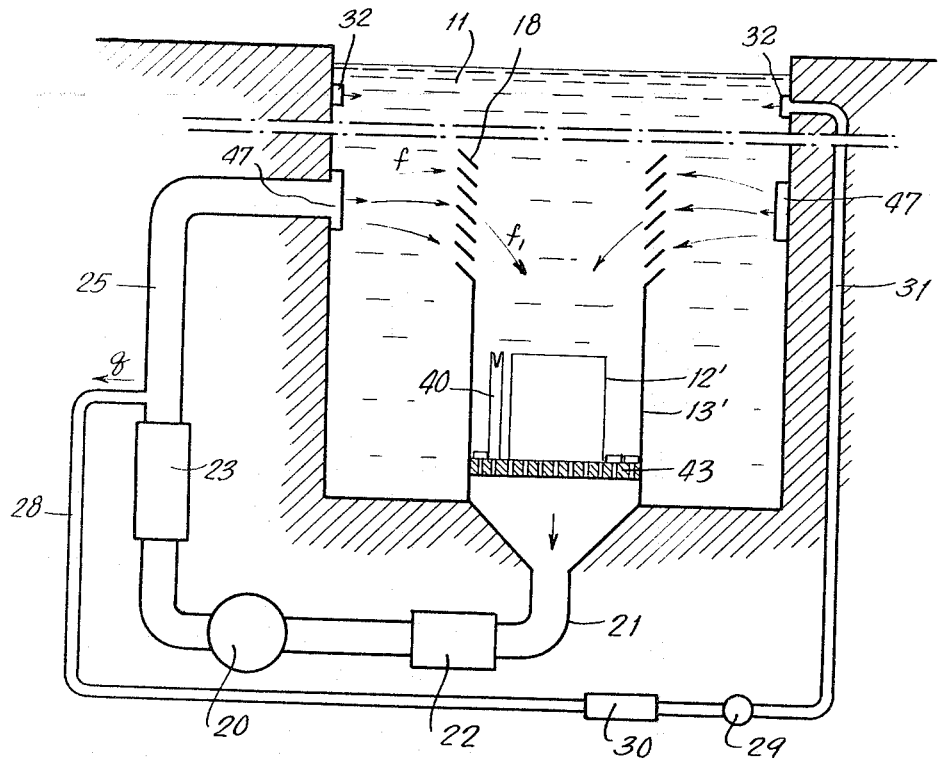
FIG. 4 is a diagrammatic view showing a modified form of guiding means for controlling the flow of cooling fluid.

In FIG. 4 of the drawings, I have shown guide vanes or slats 18 in line with and connected to the top of a reactor core tank 13' constructed similarly to that shown in FIG. 3 so that in addition to the reactor core 12', cans 40 containing elements for testing purposes may be mounted on the supporting grid or perforated partition 43. As in the construction of FIGS. 1 to 3, the cooling fluid passing through the core is drawn by a pump 20 through a duct 21 and a deactivation tank 22, and is forced up through a heat exchanger 23 and a duct 25 to an annular discharge strainer 47 which is utilized in place of the manifold 26, ducts 27 and distributors 15 of FIG. 1 to discharge the cooling water into the body 11 of swimming pool water at the periphery of such body, instead of directly into the core tank 13'. The activated cooling water discharged by the strainer 47 flows toward the slats 18 and is guided by the latter into the core 12', as indicated by the arrows $f_1$ so that none of such activated water rises upwardly toward the free surface of the pool.

As in the case of the embodiment of FIG. 1, there may be maintained on the free surface of the swimming pool, a permanent protective layer of deactivated water which is being continuously renewed, by drawing off a small flow $q$ of cooling water through a pipe 28 and an ion-exchange bed 30 by a pump 29 which then forces it up a duct 31 to the annular strainer 32 provided in the upper part of the swimming pool.

Figure 5:
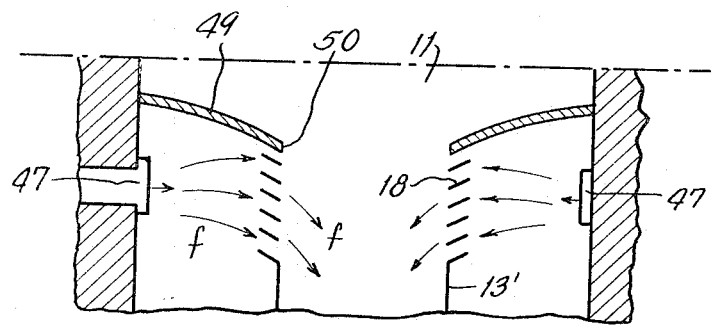
FIG. 5 is a diagrammatic view showing how a screen plate may be employed for controlling the flow of cooling fluid.

In the embodiment of FIG. 5, the guide vanes or slats 18 are shown combined with an annular screen or wall guide plate 49 located between such guide vanes and the free surface of the body 11 of the pool and cooperating with such guide vanes to establish the flow pattern of the activated cooling water in the body of the swimming pool water. The guide vanes 18 and the reactor core tank 12' are similar to those shown in FIG. 4 and the cooling water is processed and discharged into the periphery of the swimming pool water through an annular grid 47 in the same manner as discussed in FIG. 4.

The screen plate 49 may consist of a transparent material having a refraction index similar to that of the water, such as Plexiglas, in order to provide clear visibility throughout the interior of the swimming pool. The plate 49 may be made of a single piece of material, or may be made in separate removable sections to permit the storage of fuel elements in the swimming pool, as required. The plate is provided with a central orifice or opening having a cross-sectional area at least equal to that of the core and preferably slightly larger than the interior diameter of the core tank 12' in order to permit ready accessibility to the reactor core and to enable the ready insertion and positioning of cans containing elements to be treated in the active area surrounding the core.

It will be understood, that the screen plate 49 cooperates with the slats 18 to ensure that the cooling water flowing from the annular strainer 47 will flow in the direction of the arrows $f$ into the reactor core within the core tank 12' and that none of it will rise up into the protective water layer which is returned to the swimming pool above the plate 49 through the annular duct 32 in FIGS. 1 and 4 in the manner previously explained. Thus the screen plate of the embodiment of FIG. 5, assures that no inflow of the active swimming pool water into the protective layer of deactivated water established above such screen plate can take place, while at the same time ready accessibility to the reactor core is afforded. The screen plate 49 may be given any suitable configuration and may be given a special shape as shown in FIG. 5 to guide the flow of cooling water more efficiently toward the reactor core. While I have shown but one screen plate 49 in FIG. 5, it will be understood that several screen plates may be located at various levels between the upper part of the reactor core and the free surface of the swimming pool.

Screen plates of the type of the above described screen plate 49, may also be utilized to advantage without the core tank 12' and the guide slats 18. As is shown in FIG. 9 of the drawings, in such an arrangement, the reactor core 12' is mounted on a supporting screen or partition 43 of the type shown in FIGS. 3 and 4, and which covers the upper end of the cooling water intake 14' connected to the intake duct 21 through which water from the swimming pool is drawn by a pump 20 as has previously been explained and shown in FIGS. 1 and 4. Arranged above the reactor core 12' is a screen plate 49' of the type of screen plate 49 to cause the cooling flow discharging into the swimming pool through the annular strainer 47 to be guided into the reactor core as shown by the arrows $f$ so that none of it rises up into the protective water layer formed above such screen plate 49'.

It is also within the contemplation of the invention that the flow guiding screen plates and vanes, either by themselves, or in combination, may be utilized to guide a stream of cooling water having a flow which is reverse to that above described, that is, a stream flowing upwardly through the reactor core and above the core being directed outwardly through the swimming pool water toward means for causing it to be passed through a deactivation tank and heat exchanger before being fed back into the pool through the reactor core. This may be accomplished, for example, as shown in FIG. 6 by removably seating on the upper extension of the core tank 13' of the swimming pool arrangement shown in FIGS. 1 to 3, a plain or perforated screen 52 which may be configured to guide the flow, which is indicated by the arrows $f$, more efficiently towards the entry ends of the distributors 15. It will be understood that when a reverse flow of cooling water is to be provided the deactivation tank 22, pump 20 and heat exchanger 23 should be in reverse order to that shown in FIGS. 1 and 4.

FIG. 7 of the drawings shows a swimming pool construction comparable to that shown in FIG. 4, but arranged to provide a reverse flow of the cooling water from the reactor core tank 13' to the annulus 47 which now serves as an inlet for the cooling water flow. In this construction the guides 18 are connected to the guide plate 52' and the unit composed of the guides 18 and guide plate 52' is seated on the upper end of the core tank 13'. The outer peripheral edge 53 of the guide plate 52' outwardly of the guides 18 may be suitably configured to function as an additional means for guiding the cooling water flow from the vanes 18 to the annulus 47. As indicated in FIG. 7, even with a reversed flow of the cooling water it is preferred to maintain a permanent, continuously renewed, protective layer of deactivated water at the top of the swimming pool by feeding such deactivated water up through a pipe 31 to the annular discharge duct 32 at the top of the pool. As previously described, it is preferred to tap such water from the cooling water flow after the latter has passed through the heat exchanger and, in the case of a reverse flow, is on its way to the reactor core.

FIG. 9 of the drawings, illustrates how a reverse flow may be attained with the guide plate 49 of FIG. 5, or the guide plate 49' of FIG. 9, by using a centrally located supplementary guide plate 52" shown in dotted outline in such figure.

FIG. 8 illustrates how the swimming pool construction of FIGS. 1 and 2 may be modified to obtain an efficient reversed flow of the cooling water without using guide plates of the type shown in FIGS. 6, 7 and 9. The guide means of this construction differs, from that of FIGS. 1 and 2, in that the distributor 15' has been extended in height, about five feet, to provide an extension 15", and in that the height of the associated guide vanes has been correspondingly extended so that in addition to the guide vanes 18 and a plurality of the guide vanes 18', there has been added a plurality of inverted V-shaped guide vanes 18". As a result of this arrangement of guide vanes and distributors, the cooling water flow $f$ moving upwardly from the reactor core 12 will at the juncture of the distributors 15' with the core casing 13 spread out as indicated by the arrows $f_1$ and a portion of such cooling water flow will enter the lower portions of the distributors 15' and a portion of such flow will enter into the distributor extensions 15", as is indicated by the flow arrows $f_2$, and then flow back through the inverted V-shaped guide vanes 18". As the cooling water passes through the vanes 18", the latter will create a roller action $f_2$, $f_3$ with a downward flow $f_3$ in the upper part of the casing that acts to prevent the flow from the reactor core passing upwardly into the body of the swimming pool water and to influence the flow of such water from the reactor core through the vanes 18 and into the distributors 15' which are now functioning as intake members. The rollers $f_2$, $f_3$ have the further advantage in that they constitute an intermediate zone of mixture between the active hot water from the reactor core and the cold water of the swimming pool. The recirculation flows $f_2$, $f_3$ in the distributors 15' may be ameliorated by adding supplementary guide vanes 55 and 56.

While I have hereinabove described and illustrated various forms in which my invention may be practiced, it will be apparent to those skilled in the art that various changes in and modifications of such forms may be made without departing from the spirit of the invention. As an example, in the embodiment of FIG. 1, the cooling water ducts 27 illustrated could be replaced by a concentric casing surrounding the core tank 13 and extending from the bottom of the swimming pool floor to the flow distributors. Hence I intend to cover all forms of my invention coming within the scope of the appended claims.

I claim:

1. The combination in a swimming pool type reactor having a reactor core immersed in a pool of water contained in an open swimming pool, of means for establishing a closed circuit of highly radioactive cooling water which passes through the pool of water and said reactor core, and a portion of such circuit being open to the pool of water so that the cooling water flows as a stream through the pool of water, said means comprising a duct circuit portion connected at its ends with said open circuit portion and forming with the latter said closed cooling water circuit, said duct circuit portion including a pump for circulating the cooling water through said closed circuit, deactivating means, and a heat exchanger, and means associated with said open circuit portion for controlling the flow of the cooling water from one end of said duct circuit portion and through the pool of water to the other end of said duct circuit portion, said controlling means being located in the pool of water above said reactor core and being constructed and arranged in said pool of water as to enable access to said reactor core from the upper free surface of said pool of water.

2. The combination defined in claim 1 in which said associated means comprises an upright tank enclosing said reactor core and extending upwardly to a point short of the upper free surface of the pool of water, the bottom of said tank being connected to one end of said duct circuit portion and being provided with an orifice bringing the interior of the tank into communication with said duct circuit portion, the top of said tank being open to the water in the pool under the upper free surface thereof, and a flow control device between the open top of said tank and the other end of said duct circuit portion.

3. The combination defined in claim 2, in which said flow control device controls the flow of cooling water by pressure distribution of such water, and including flow guiding means cooperable with said control device to control the path of flow of said cooling water through said open circuit portion.

4. The combination defined in claim 1, in which one end of said duct circuit portion is located adjacent to the bottom of said swimming pool, and in which the other end of said duct circuit portion is spaced substantially above in offset relation to said one end of said duct circuit portion, and in which said reactor core is supported adjacently above said one end of said duct circuit portion, said other end of said duct circuit portion being vertically offset from said reactor core.

5. The combination defined in claim 4, in which said other end of said duct circuit portion is located at the periphery of said pool of water.

6. The combination defined in claim 4, in which said associated means comprises an upright tank enclosing and supporting said reactor core, the bottom end of said tank being connected to said one end of said duct circuit portion and being provided with an orifice bringing the interior of the tank into communication with said one end of said duct circuit portion, the top of said tank being open and being located below the upper free surface of the pool of water, and a flow control device between the open top of said tank and the other end of said duct circuit portion.

7. The combination defined in claim 4, including a horizontal perforated support for said reactor core closing said one end of said duct circuit portion and having an area at least equal to the cross-sectional area of said reactor core, said reactor being seated on said perforated support.

8. The combination defined in claim 4, in which said associated means comprises an annular screen plate located between the top of the reactor core and the upper free surface of the pool of water, the central opening in said screen plate having a cross-sectional area at least equal to that of the core and permitting ready access to the reactor core from the upper free surface of the pool of water.

9. The combination defined in claim 2, in which said flow control device comprises a vertically disposed series of guiding vanes at the top of said tank and located outside the interior area of said tank.

10. The combination defined in claim 9, in which said other end of said duct circuit portion provides a flow orifice located adjacent to said series of guiding vanes and outside the vertical area occupied by said reactor core, and an apertured plate covering such flow orifice, the apertures in said plate being variably sized to cause the cooling water to flow according to a given velocity distribution curve.

11. The combination defined in claim 1, including an auxiliary circuit tapped to said cooling water circuit and comprising a pump, an ion exchange bed, and discharging means located at the top of said swimming pool and adapted to discharge the deactivated water into the pool of water above said associated flow controlling means to provide a protective layer of such deactivated water in the pool of water over said open circuit portion.

12. The combination defined in claim 7, in which the area of said support is substantially greater than the cross-sectional area of said reactor core to provide a support area outside said reactor core in the circuit of activated cooling water.

13. The combination defined in claim 1, in which said associated means comprises a removable screen plate positioned over said reactor core and between the latter and the upper free surface of the pool of water, said screen plate being configured to guide cooling water passing through said open duct portion.

14. The combination defined in claim 1, in which said associated means comprises a vertically aligned series of spaced guide vanes located above said reactor core and located outside a vertical projection of the area occupied by said reactor core, the lower guide vanes in said series guiding the cooling water in its flow toward said other end of said duct circuit, and means cooperable with the upper guide vanes in said series for creating roller currents through such upper guide vanes and having a downwardly curved flow within said projected area above said reactor core.

15. The combination defined in claim 14, in which the lower vanes in said series have a straight inclined cross-sectional configuration, and in which a plurality of the upper vanes have an inverted V-shape in cross-section, and in which said cooperable means comprises a guide member constructed and arranged with relation to said series of guide vanes to direct a portion of the flow of cooling water through said upper vanes so as to create with the latter the roller current action about such upper vanes.

References Cited by the Examiner

UNITED STATES PATENTS

| | | | |
|---|---|---|---|
| 2,992,176 | 7/1961 | Schoessow | 176—62 X |
| 3,042,601 | 7/1962 | Loeb | 176—62 X |
| 3,141,828 | 7/1964 | Steinert | 176—62 |

FOREIGN PATENTS 1,224,251    2/1960    France.

CARL D. QUARFORTH, *Primary Examiner.*

L. DEWAYNE RUTLEDGE, *Examiner.*